May 13, 1969     K. G. KREUTER     3,443,580
DIAPHRAGM VALVE MOUNTED IN A CONTROL KNOB
Filed Jan. 20, 1967
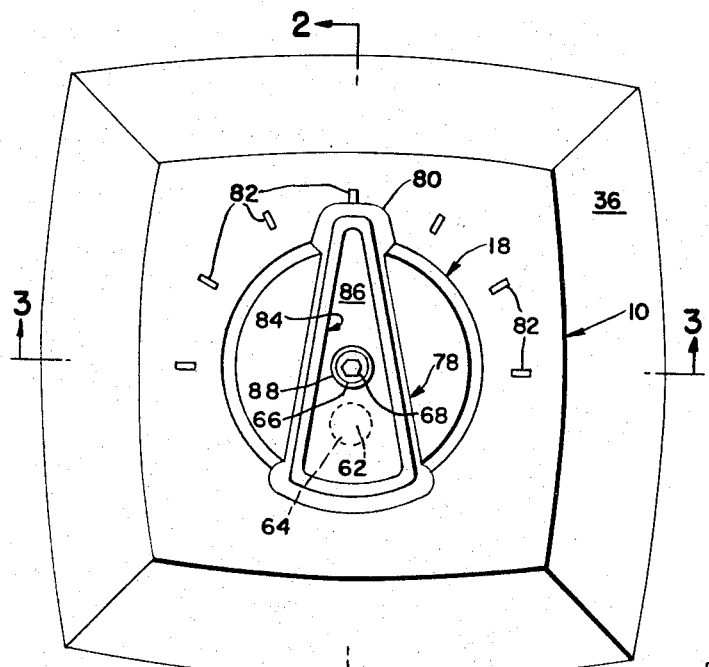
FIG. 1.
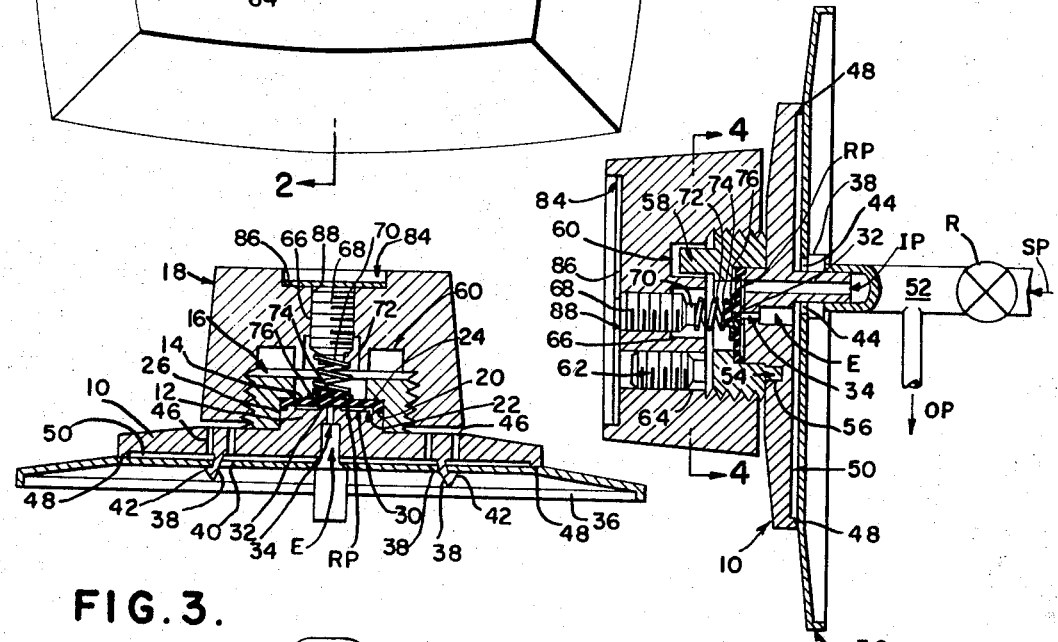
FIG. 3.
FIG. 2.
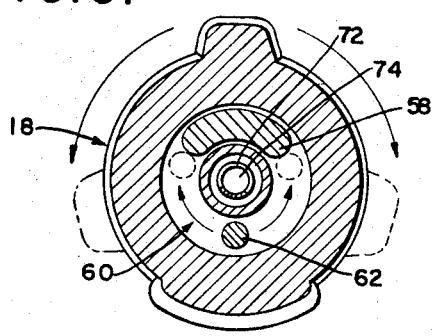
FIG. 4.
INVENTOR
Kenneth G. Kreuter
BY *Birch and Birch*
ATTORNEYS

United States Patent Office 3,443,580
Patented May 13, 1969

3,443,580
DIAPHRAGM VALVE MOUNTED IN A CONTROL KNOB
Kenneth G. Kreuter, Goshen, Ind., assignor to Robertshaw Controls Company, Richmond, Va., a corporation of Delaware
Filed Jan. 20, 1967, Ser. No. 610,618
Int. Cl. F16k *31/145*
U.S. Cl. 137—315                      3 Claims

ABSTRACT OF THE DISCLOSURE

A pressure regulator contained wholly within a calibrated control knob is provided including a rotatable calibrated knob, a base plate and a mounting plate for the control knob assembly which forms a pressure exhaust or vent chamber with the base plate. The knob and base plate assembly are attached to the mounting plate by a snap coupling arrangement in which spring detents on the base plate cooperate with slots in the mounting plate, and the base plate includes pressure ports connecting the pressure exhaust chamber to atmosphere. The control knob is externally threaded on an upstanding sleeve on the base plate, which sleeve maintains a flexible diaphragm on the base plate over a bleed port and defines, with the base plate, a pressure input chamber which is selectively vented through the bleed port to the exhaust chamber by the diaphragm. A bias spring is maintained between the control knob and the diaphragm such that rotation of the control knob, within predetermined limits of displacement, selectively effects a linear, adjustable, range of regulated pressures in the pressure input chamber.

---

This invention relates to pressure regulators and more particularly to a variable bleed, diaphragm operated pneumatic pressure regulating unit having a linear response over a relatively wide range of operation such as, for example, a range of selectively controlled pressures capable of selectively establishing the full range of set points for a pneumatically controlled heating and cooling system or the like.

It is an object of this invention to provide a new and novel pneumatic pressure regulating unit.

It is another object of this invention to provide a new and novel pressure regulating unit of optimum compactness and simplicity with an attendant low cost of manufacture.

Another object of this invention is to provide a new and novel pressure regulating unit comprising a rotary adjusting knob mounted on a fixed indexed base wherein all of the operative pressure regulating components are contained within the said adjusting knob.

Still another object of this invention is to provide a new and novel pressure regulating unit comprising a self-contained remote set point station for pneumatically controlled heating and cooling systems and the like.

Yet another object of this invention is to provide a new and novel pressure regulating unit comprising a self-contained remote set point station for pneumatically controlled heating and cooling systems and the like, wherein said unit includes a new and novel combination of elements providing calibration and a linear controlled pressure response to all index settings throughout the operating range of the unit.

These and other objects of this invention will become more fully apparent with reference to the following specification and drawings, which relate to a preferred embodiment of the invention.

In the drawings:

FIGURE 1 is a top plan view of a preferred physical embodiment of the pressure regulator of the present invention;

FIGURE 2 is a cross section taken along line 2—2 of FIGURE 1;

FIGURE 3 is a cross section taken along line 3—3 of FIGURE 1; and

FIGURE 4 is a cross section taken along line 4—4 of FIGURE 2.

Referring in detail to the drawings and more particularly to FIGURES 1, 2 and 3, the pressure regulating unit is shown as including a base plate 10 having a raised cylindrical center portion 12, a flexible diaphragm 14 overlying the center portion 12, said diaphragm being a molded rubber disk or the like, a counterbored externally threaded sleeve 16 fitted over the center portion 12 and securing the diaphragm 14 thereto, and an internally threaded adjusting knob assembly 18 threaded onto the sleeve 16.

The raised center portion 12 of the base plate 10 has an annular peripheral shoulder 20 with a raised annular boss 22 disposed about the inner periphery thereof, the said shoulder 20 and boss 22 cooperating with an internal annular shoulder 24 in the counterbore 26 of the threaded sleeve 16 to compressibly secure a raised integral annular bead 28 on the periphery of the diaphragm 14. Thus, the diaphragm 14 is secured over the face of the raised center portion 12 on the base plate 10.

Beneath the diaphragm 14, the face of the center portion 12 is relieved of an annular channel 30, leaving an upstanding central boss 32 adjacent the center of the diaphragm 14. The boss 32 is provided with a through-port or flow orifice 34 which is in communication with the atmosphere via a counterbored exhaust port E in the opposite or back side of the base plate 10.

The boss 32 and orifice 34 comprise a bleed-port 32–34, selectively controlled by the diaphragm 14 as will be hereinafter more fully described.

The base plate 10 is snap-fastened to a mounting plate 36 or the like by means of a pair of dependent spring tabs or detents 38 on the back face of the base plate 10 which extend through slots 40 in the mounting plate 36. The detents 38 are formed with shoulders 42 at the outer ends thereof to snap over the edges of the slots 40 in the mounting plate 36 and engage the rear face thereof to hold the base plate 10 in fixed position thereon.

The mounting plate 36 is ported at 44 to pass a pressure connection PC from the back of the base plate 10.

The pressure connection PC includes an input pressure port IP which extends into communication with the annular channel 30 beneath the diaphragm 14; the said channel 30 and diaphragm 14 comprising a regulated pressure chamber RP. The pressure chamber RP is adapted to be placed into communication with the bleed-port 32–34 and exhaust port E by movement of the diaphragm 14 away from the boss 32 as will be hereinafter more fully described.

The exhaust port E is in communication with the atmosphere through the port 44 in the mounting plate 36 and through open slots 46 in the base plate 10, the latter being shown in FIGURE 3, and the base plate 10 being shown in FIGURES 2 and 3 as being only in peripheral contact with the mounting plate 36 by means of a peripheral shoulder 48. This leaves an air space 50 between the base plate 10 and mounting plate 36.

The input port IP is supplied with input pressure through a pressure line 52, downstream from a pressure restrictor R in a main supply lead SP, adapted to be connected to a source of supply pressure (not shown).

Output pressure from the pressure regulator is taken from a branch pipe or output pressure connection OP located in the pressure line 52 downstream of the restrictor R. Thus, the output pressure is the back pressure in the regulated pressure chamber RP, which back pressure is also effected in the input port IP and pressure line 52 on the downstream side of the restrictor R.

As specifically shown in FIGURE 2, the threaded sleeve 16 is indexed with respect to the base plate 10 by means of a dependent integral index pin 54, engaging a slot or socket 56 in the base plate 10.

As shown in FIGURES 2 and 4, the index pin 54 is diametrically opposed with an arcuate boss or limit stop 58 on the outer end of the sleeve 16 within the adjusting knob assembly 18.

The limit stop 58 extends into an internal annular channel 60 in the adjusting knob assembly 18, thereby permitting rotation of the said knob 18 on the threaded sleeve 16.

In order to control the limits of rotation of the knob assembly 18, a radially offset stop pin 62 in the form of an Allen head screw or the like is threadably mounted for axial adjustment in a bore 64 in the knob assembly 18, the said bore 64 extending into the annular channel 60 from the outer face of the said knob assembly 18.

An axial bore 66 is also provided in the knob assembly 18 wherein there is threadably mounted for axial adjustment a calibrating screw 68 having an Allen head configuration or the like.

The calibrating screw is coaxial with the knob assembly 18, the threaded sleeve 16 and the diaphragm 14 and is provided with a spring keeper 70 on the inner end thereof.

Referring to FIGURES 2, 3 and 4, a calibrating compression spring 72, in the form of a helical coil, extends from the keeper 70 on the calibrating screw 68 to an integral spring keeper 74 on the face of the diaphragm 14. If desired, the diaphragm 14 may include a metal washer 76 or other annular stiffening member around the integral keeper 74 to provide adequate support for the thread of the calibrating spring 72 on the diaphragm 14.

The knob assembly 18, as shown in FIGURE 1, includes a wedge-shaped integral molded portion 78 having a radially extended index tip 80 which is adapted to be selectively placed in registry with one of a plurality of scale indicia 82 on the outer face of the base plate 10.

Within the outer face of the wedge portion 78, a wedge-shaped cavity 84 is formed (shown in cross-section in FIGURES 2 and 3) and a masking plate 86 is inserted therein. The plate 86 covers the bore 64 and stop screw 62 therein but is provided with a port 88 in registry with the axial port 66 to allow adjustments of the calibrating screw 68 to be made.

*Operation*

Referring to FIGURES 1, 2, 3 and 4, the operation of the pressure regulator of this invention is as follows:

Assuming pneumatic supply pressure being applied to the supply line SP, a flow will be initiated through the restrictor R, input line 52, and pressure input IP into the regulator chamber RP, causing a pressure buildup in the chamber RP and a corresponding force on the diaphragm 14 in opposition to the force of the calibrating spring 72.

Depending on the force of the spring 72, pressure will build up in the chamber RP until sufficient force is generated on the diaphragm 14 to overcome the force of the calibrating spring 72 and lift the diaphragm 14 off the central boss 32, against which it is normally biased by the calibrating spring 72.

This causes the regulator chamber RP to vent to atmosphere through the bleed-port 32–34, exhaust port E, chamber 50 and vent slots 46, thereby preventing the pressure in the regulator chamber RP from exceeding a preset limit determined by the force of the calibrating spring 72 on the diaphragm 14.

The pressure in the regulator chamber RP is reflected back into the input line 52 from which it is transmitted to a point of use through the branch output line OP.

To be fully effective, a pressure regulator must be readily adapted to calibration over a selected range of pressure outputs and at the same time exhibit a linear response over that pressure range. That is, for example, equal displacements of the set point device of the regulator must produce equal changes in the output pressure of the regulator over the selected range of pressure outputs.

The present invention provides such a linearity of response with selection of range and set points being made as follows:

The set point device of the present invention is the knob assembly 18. The index tip 80 thereon is selectively indexed through a rotary displacement to register with a selected one of the dial indicia 82 on the base plate 10 by rotating the knob assembly 18 on the externally threaded sleeve 16.

The threads on the sleeve 16, upon rotation of the knob assembly 18, act as a cam means to axially displace the knob 18 and calibrating screw 68 therein toward and away from the diaphragm 14 depending on the direction of rotation. Therefore, the calibrating spring 72 is compressed in proportion to this displacement between the keeper 70 on the calibrating screw 68 and the keeper 74 and stiffener 76 on the diaphragm 14.

This changes the force of the calibrating spring against the diaphragm 14 and accordingly changes the pressure required in the regulator chamber RP to overcome this force.

As a result, rotation of the knob assembly 18 causes a linearly responsive change in the output pressure in the branch output line OP.

If the knob 18 is rotated counterclockwise on the sleeve 16 (see FIGURE 4), the stop pin 62 will eventually engage the right-hand tip of the arcuate limit-stop 58, corresponding to one extreme limit of the range of controlled pressures which can be effected by the pressure regulator.

The specific value of the one extreme limit of the pressure range can now be set as follows:

A suitable reading of the output pressure from the branch line OP is made with the knob 18 turned to the extreme counterclockwise limit of the stop pin 62.

The calibrating screw 68 is then rotated in the bore 66 by inserting a suitable Allen wrench or the like through the port 88 in the cover plate 86. This causes an axial displacement of the calibrating screw 68 and spring keeper 70 thereon to selectively alter the compressed state of the calibrating spring 72 and thereby vary the force on the diaphragm 14 and the output pressure in the branch output line OP to the desired extreme value.

Thereafter, clockwise rotation of the knob assembly 18 causes a linear variation in the output pressure derived from the branch otuput line OP until the stop pin 62 abuts the opposite or left-hand tip of the arcuate limit stop 58.

The extreme desirability of this invention in view of its linear response characteristics is further enhanced by its compactness, all of the operative components being of small size and completely contained within the operating knob 18 thereof.

The knob 18 is of a size such as is normally found on consumer radios and the like, and may be readily modified in size as the situation demands.

For example, the size of the regulator and its operating knob 18 illustrated in the drawings is approximately double the size of a preferred embodiment of the present invention.

What is claimed is:
1. Pressure regulator means comprising pressure transmitting means including a main pressure supply line adapted to be connected to a pressure source, a flow restrictor in said supply line, and a pressure regulating chamber downstream of said restrictor supplied therethrough from said supply line, said chamber including a bleed-port and a pressure output connection; a mounting plate for said regulator including a through-port and lock-slots; and a housing and control knob structure comprising a base plate, flexible diaphragm means mounted over a portion of said base plate forming part of said regulating chamber therewith and adapted to control flow of pressure through said bleed-port and thereby control the magnitude of pressure in said regulating chamber, hollow control knob means displaceably mounted on said base plate and enclosing said diaphragm means, and biasing means in said control knob engaged therewith and with said diaphragm means exerting a selectively variable force on said diaphragm means in response to a displacement of said control knob; said base plate including a peripheral shoulder engaged with said mounting plate forming an exhaust chamber between said mounting and base plates, spring detents on said base plate interlocking with said mounting plate through said lock-slots and pressure ports connecting said exhaust chamber with atmosphere; and said bleed-port being in selective communication with said regulating and exhaust chambers as controlled by said diaphragm means.

2. For use in pressure regulating means and the like, in combination, a mounting plate including a through-port and lock-slots, said through-port being adapted to receive pressure connections; and a housing and control knob structure comprising a base plate, pressure transmitting means, flexible diaphragm means mounted over a portion of said base plate and forming a pressure chamber therewith in communication with said pressure transmitting means, hollow control knob means displaceably mounted on said base plate and enclosing said diaphragm means, biasing means in said control knob means engaged therewith and with said diaphragm means exerting a selectively variable force on said diaphragm means in response to a displacement of said control knob means, and spring detent means on said base plate interlocking with said mounting plate through said lock-slots.

3. The invention defined in claim 2, wherein said pressure transmitting means include a variable bleed-port controlled by said diaphragm means; and wherein said base plate includes a peripheral shoulder engaged with said mounting plate forming an exhaust chamber between said mounting and base plates and pressure ports connecting said exhaust chamber with atmosphere; said bleed-port being in communication with said exhaust chamber.

References Cited
UNITED STATES PATENTS

| | | | |
|---|---|---|---|
| 2,316,373 | 4/1943 | Thomas | 137—505.38 XR |
| 2,902,047 | 9/1959 | Tavener | 137—505.18 |
| 2,918,082 | 12/1959 | Pinke | 137—510 XR |
| 3,354,902 | 11/1967 | Obermaier | 137—496 |
| 3,357,687 | 12/1967 | Vanderpoel | 137—505.42 XR |

HAROLD W. WEAKLEY, *Primary Examiner.*

U.S. Cl. X.R.

137—496, 510